US006634001B2

(12) United States Patent
Anderson et al.

(10) Patent No.: US 6,634,001 B2
(45) Date of Patent: *Oct. 14, 2003

(54) REMOTE MONITORING OF COMPUTER PROGRAMS

(75) Inventors: Mark D. Anderson, Palo Alto, CA (US); Evan J. Bigall, Palo Alto, CA (US); Christine Clifford, Mountain View, CA (US); Reed Hastings, La Honda, CA (US); Jon Sorensen, Sunnyvale, CA (US); Douglas Pan, Milpitas, CA (US)

(73) Assignee: IBM Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/907,510

(22) Filed: Jul. 16, 2001

(65) Prior Publication Data

US 2002/0049934 A1 Apr. 25, 2002

Related U.S. Application Data

(63) Continuation of application No. 09/340,862, filed on Jun. 28, 1999, now Pat. No. 6,263,457, which is a continuation of application No. 08/657,106, filed on Jun. 2, 1995, now Pat. No. 5,918,004, which is a continuation-in-part of application No. 08/460,516, filed on Jun. 2, 1995, now abandoned.

(51) Int. Cl.[7] ................................................ G06F 11/00
(52) U.S. Cl. .......................... 714/38; 714/35; 714/26; 714/37; 714/47
(58) Field of Search .......................... 714/38, 35, 26, 714/37, 47

(56) References Cited

U.S. PATENT DOCUMENTS 5,142,679 A * 8/1992 Owaki et al. .................. 714/38
5,539,659 A * 7/1996 McKee et al. ............... 702/187
5,918,004 A * 6/1999 Anderson et al. ............. 714/25
6,009,514 A * 12/1999 Henzinger et al. ........... 712/236
6,263,457 B1 * 7/2001 Anderson et al. ............. 714/26

FOREIGN PATENT DOCUMENTS

WO    WO 96/38733    * 12/1996

* cited by examiner

Primary Examiner—Ly V. Hua
(74) Attorney, Agent, or Firm—Ritter, Lang & Kaplan LLP

(57) ABSTRACT

Systems and methods for remotely monitoring the execution of computer programs are provided. Monitoring instructions are added the computer program so that during execution of the program, data may be collected regarding the program execution. The collected data may be automatically sent to a remote system or site for analysis. The monitoring instructions create little or no performance impact on the client yet provide valuable information to the developer of the program. Additionally, the monitoring instructions may be changes during computer program development.

24 Claims, 9 Drawing Sheets

Microfiche Appendix Included
(17 Microfiche, 1027 Pages)

| | PUT TERMINATION CATEGORIES | (ENUM PV_END_TYPE) | INFORMATION AVAILABLE |
|---|---|---|---|
| 1 | PUT NORMAL EXIT | PV_EXIT | EXIT CODE |
| 2 | PUT EXECS | PV_EXEC | NEW EXECUTABLE NAME |
| 3 | PUT EXCEPTION CAUGHT BY DEVELOPER | PV_EXCEPTION_EXIT | EXCEPTION NUMBER + EXIT CODE |
| 4 | PUT EXCEPTION UNCAUGHT BY DEVELOPER | PV_EXCEPTION | EXCEPTION NUMBER |
| 5 | PUT DIES VIA UNCATCHABLE EVENT | PV_SPECIAL_EXCEPTION | EXCEPTION NUMBER IF AVAILABLE |
| 6 | DEVELOPER ENDS RUN BEFORE PUT ENDS | PV_LOGICAL_END | DESCRIPTION STRING FROM DEVELOPER |
| 7 | PUREVISION DIES VIA AN UNEXPECTED EVENT | PV_MONITOR_DIED | NOTHING |

FIG. 7.

REMOTE MONITORING OF COMPUTER PROGRAMS

This is a Continuation of prior application Ser. No. 09/340,862, filed Jun. 28, 1999 now U.S. Pat. No. 6,263,457, which is a continuation of prior application Ser. No. 08/657,106, filed Jun. 2, 1995, now issued as U.S. Pat. No. 5,918,004, which is a continuation-in-part of prior application Ser. No. 08/460,516, now abandoned, which are hereby incorporated by reference.

This application is a continuation-in-part of U.S. application Ser. No. 08/460,516, filed Jun. 2, 1995, which is hereby incorporated by reference for all purposes.

MICROFICHE APPENDIX

The Microfiche Appendix (17 fiche with total of 1027 frames) includes source code for implementing an embodiment of the invention.

COPYRIGHT NOTICE

A portion of the disclosure of this patent document contains material which is subject to copyright protection. The copyright owner has no objection to the xerographic reproduction by anyone of the patent document or the patent disclosure in exactly the form it appears in the Patent and Trademark Office patent file or records, but otherwise reserves all copyright rights whatsoever.

BACKGROUND OF THE INVENTION

The present invention is related to remote monitoring of computer programs and, more particularly, to a adding remote monitoring instructions to a computer program so that the execution of the computer program may be monitored at a remote site.

As computer systems increasingly become more powerful and complex, so too do the computer programs that operate upon these computer systems. The increased complexity has resulted in much longer development times. Currently, computer programs take months and sometimes years to progress from pre-alpha through beta and final release.

Developers have long realized that when a computer program is very complex, it is more efficient to have customers run the computer program (typically beta versions) so that the full functionality of the computer program in different environments may be exercised. Few developers have the people, machines and time to do the testing that may be provided by their customers.

There are many problems that are presented with beta testing computer programs. Many of the problems revolve around the fact that the developer is at a remote site from the customers. At the remote site, it is difficult for the developer to know what is happening on a customer's computer system. Most customers do not have the expertise or resources to effectively convey problems to the developer. Without adequate information, it may be nearly impossible for a developer to correct a problem.

The preceding is just one of the problems presented to a developer that is trying to develop a computer program that is running at a customer's site. Other problems include customers having platform differences, dealing with the evolving computer program through to final release, upgrading customers' computer programs, tracking bugs, analyzing multi-tasking or multi-threaded applications, and developing multi-vendor applications just to name a few.

SUMMARY OF THE INVENTION

The present invention provides innovative systems and methods for remotely monitoring the execution of computer programs. Monitoring instructions (or data collecting instructions) are added the computer program so that during execution of the program, data may be collected regarding the program execution. The collected data may be automatically sent to a remote system or site for analysis. The present invention creates little or no performance impact on the client yet provides valuable information to the developer of the program.

In one embodiment, the present invention provides a method of remotely monitoring execution of a computer program in a computer system, comprising the steps of: modifying the computer program to include at least one monitoring instruction; executing the computer program; the at least one monitoring instruction collecting data regarding the execution of the computer program; and sending the collected data to a remote system.

In another embodiment, the present invention provides a distributed computer system, comprising: a server computer; a client computer in communication with the server computer; and a computer program running on the client computer that includes monitoring instructions that collect and send data regarding execution of the computer program to the server computer.

In another embodiment, the present invention provides a computer program product for remotely monitoring execution of a computer program, comprising: a computer readable storage medium storing the computer program comprising: code that calls at least one monitoring instruction, the at least one monitoring instruction collecting data regarding the execution of the computer program; and code that sends the collected data to a remote system.

Other features and advantages of the present invention will become apparent upon a perusal of the remaining portions of the specification and drawings.

BRIEF DESCRIPTION OF THE DRAWINGS

FIG. 7 is a table of types of end-run-conditions for computer programs and the information that may be available;

DETAILED DESCRIPTION OF PREFERRED EMBODIMENTS

The present invention provides a remote data collection facility that may be utilized for developers to monitor a program under test (PUT). A PUT is therefore a computer program or application that has been distributed to a client (or other site) for which the developer would like to monitor the execution remotely. This remote monitoring may be performed from pre-alpha through beta and final release. In a preferred embodiment, the present invention is incorporated in PureVision (PV) which is available from Pure Software Inc., Sunnyvale, Calif.

In the description that follows, the present invention will be described in reference to an IBM compatible computer running under one of the Windows family of operating systems. The present invention, however, is not limited to any particular computer architecture or operating system. Therefore, the description the embodiments that follow is for purposes of illustration and not limitation.

Figure 1:
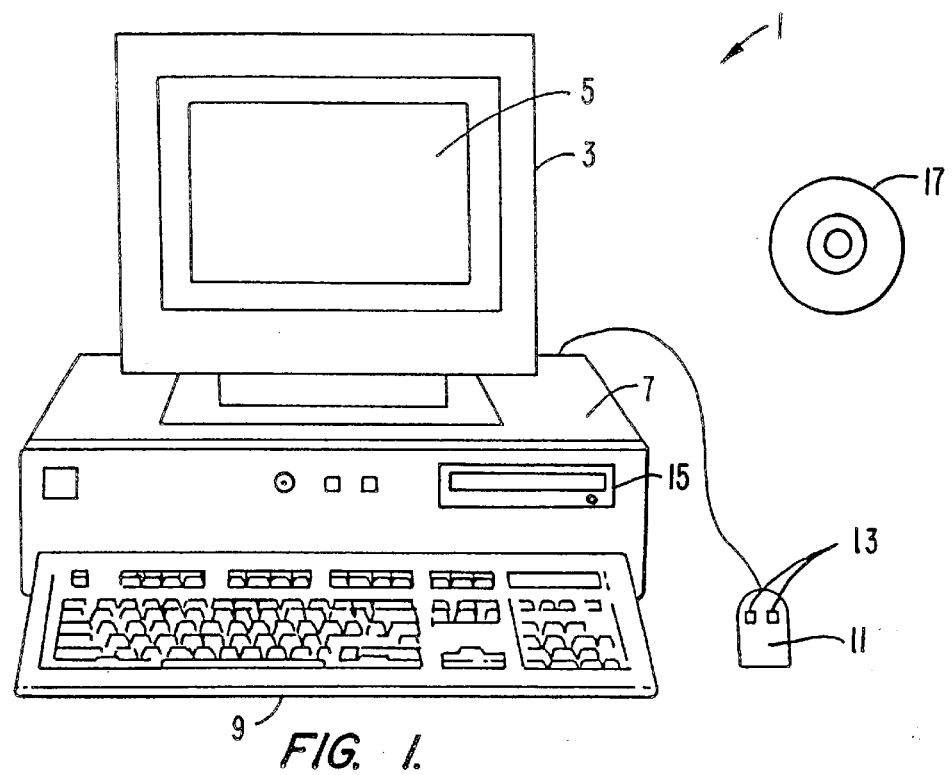
FIG. 1 illustrates an example of a computer system used to execute the software of the present invention.

FIG. 1 illustrates an example of a computer system used to execute the software of the present invention. FIG. 1 shows a computer system 1 which includes a monitor 3, screen 5, cabinet 7, keyboard 9, and mouse 11. Mouse 11 may have one or more buttons such as mouse buttons 13. Cabinet 7 houses a CD-ROM drive 15, a system memory and a hard drive (see FIG. 2) which may be utilized to store and retrieve software programs incorporating code that implements the present invention, data for use with the present invention, and the like. Although a CD-ROM 17 is shown as an exemplary computer readable storage medium, other computer readable storage media including floppy disks, tape, flash memory, system memory, and hard drives may be utilized. Cabinet 7 also houses familiar computer components (not shown) such as a central processor, system memory, hard disk, and the like.

Figure 2:
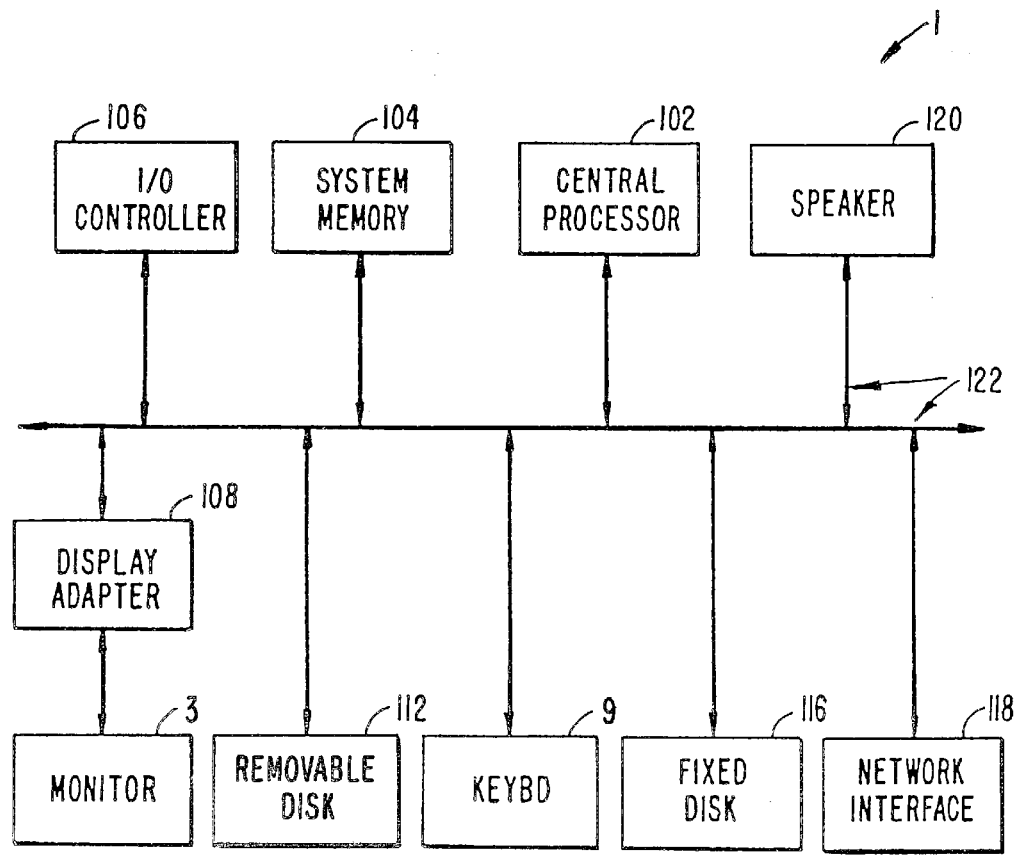
FIG. 2 shows a system block diagram of a typical computer system used to execute the software of the present invention.

FIG. 2 shows a system block diagram of computer system 1 used to execute the software of the present invention. As in FIG. 1, computer system 1 includes monitor 3 and keyboard 9. Computer system 1 further includes subsystems such as a central processor 102, system memory 104, I/O controller 106, display adapter 108, removable disk 112 (e.g., CD-ROM drive), fixed disk 116 (e.g., hard drive), network interface 118, and speaker 120. Other computer systems suitable for use with the present invention may include additional or fewer subsystems. For example, another computer system could include more than one processor 102 (i.e., a multi-processor system) or a cache memory.

Arrows such as 122 represent the system bus architecture of computer system 1. However, these arrows are illustrative of any interconnection scheme serving to link the subsystems. For example, a local bus could be utilized to connect the central processor to the system memory and display adapter. Computer system 1 shown in FIG. 2 is but an example of a computer system suitable for use with the present invention. Other configurations of subsystems suitable for use with the present invention will be readily apparent to one of ordinary skill in the art.

Figure 3:
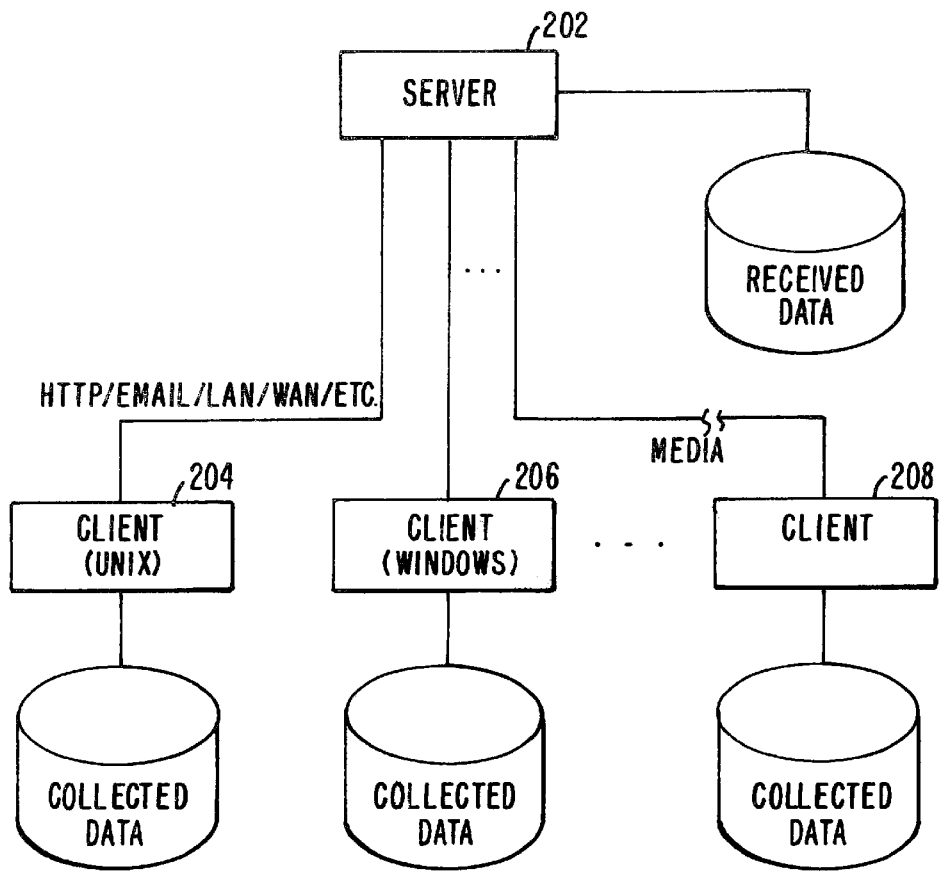
FIG. 3 is a block diagram of a distributed computer system where a server computer may remotely monitor execution of computer programs on client computers.

FIG. 3 is a block diagram of a distributed computer system where a server computer may remotely monitor execution of PUTs on client computers. A server computer 202 is in communication with multiple clients, of which clients 204, 206 and 208 are shown. The server may communicate with the clients via transport mechanisms known in the art including HTTP, email, network of LAN or WAN, and the like. Additionally, the server and clients may communicate via a media like a floppy or tape as shown between the server and client 208.

The computer system that monitors a PUT will be designated a "server" and a computer system on which the PUT executes will be designed a "client." For simplicity, the server computer will be described as the computer system that performs development of the PUT and remote monitoring of execution of the PUT. However, the development and remote monitoring may be performed on entirely different computer systems and at different locations.

A client executes the PUT which includes additional monitoring instructions for collecting data regarding the PUT execution. The collected data may be stored locally on the client until it is transferred to the server for analysis. The collected data is sent or transferred to the server via a transport mechanism.

The present invention provides a platform independent application programming interface (API) for directing the data collection for an executing PUT. As shown, client 204 is operating under the Unix operating system. In contrast, client 206 is operating under one of the family of Windows operating systems. The API of the present invention (PV API) is portable as a same set of API calls apply to PUTs running on both operating systems. This functionality allows developers to create a single source tree across different platforms. Although platform-specific API calls may be provided, these calls will be ignored if the platform is incompatible.

Figure 4:
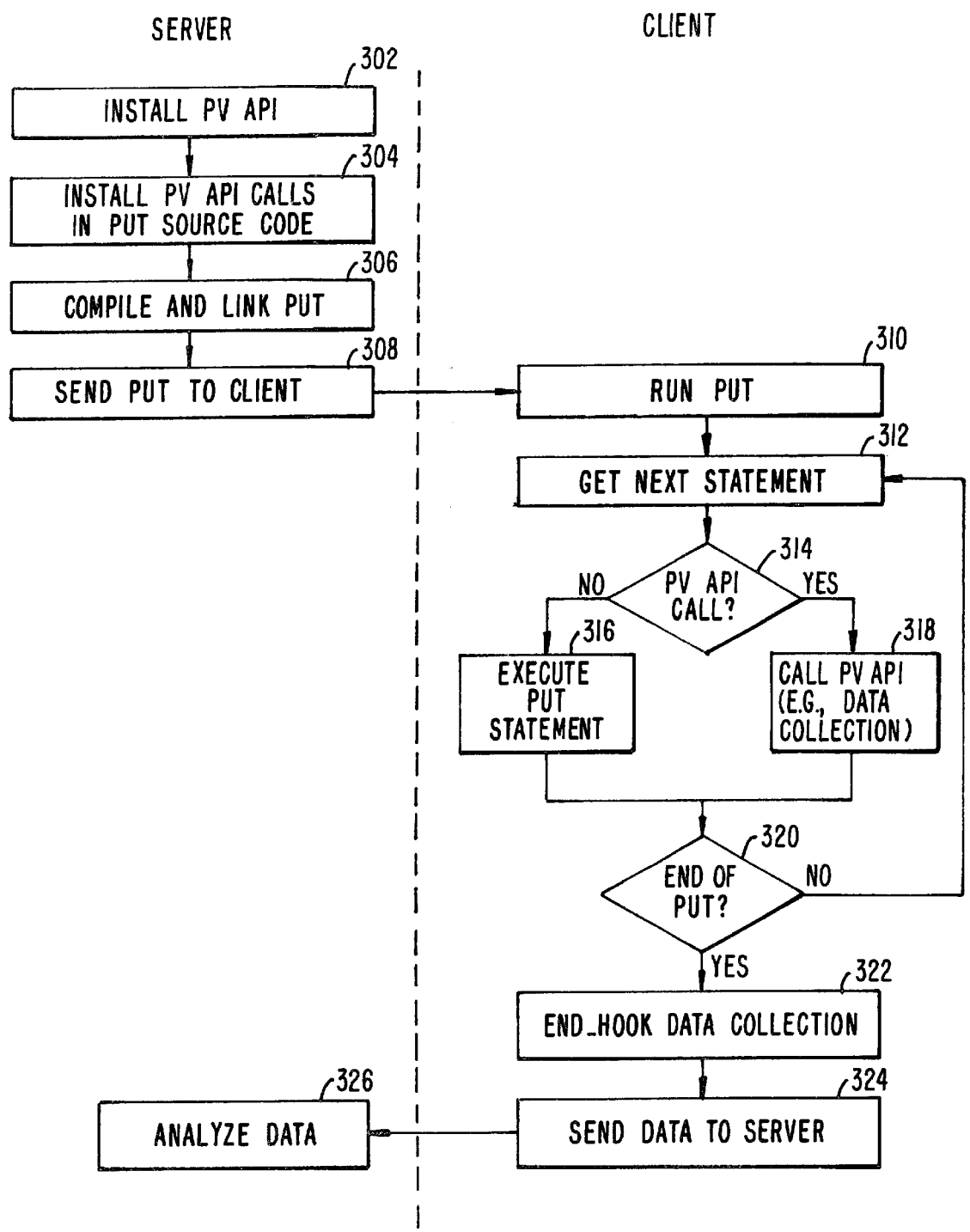
FIG. 4 is a high level flowchart of a process of remotely monitoring execution of a computer program.

FIG. 4 is a high level flowchart of a process of remotely monitoring execution of a PUT. The flowchart is divided into a server-side and a client-side to indicate on which computer systems the steps are performed. At step 302, the PV API is installed on the server computer for remotely monitoring the PUT. In a preferred embodiment, the PV API calls are stored in a dynamic-link library (DLL). As will be discussed in more detail in reference to FIGS. 5 and 6, hooks that are available in Windows may be utilized to intercept the system calls. A similar mechanism may be utilized for Unix systems.

At least one PV API call is placed in the PUT source code at step 304. The PV_Start call may be added to the PUT source code to start monitoring of the PUT during execution. Data will be collected regarding the execution and, in a preferred embodiment, the collected data will be automatically sent to the server. The data is typically collected until the PUT finishes execution. Other PV API calls may be utilized to customize the data collection. Thus, developers may dynamically change the data that will be collected over the application development cycle from pre-alpha to beta through final release.

At step 306, the PUT is compiled and linked into an executable computer program. After the PUT is a computer program that incorporates remote monitoring instructions, the PUT is sent to the client. The PUT may be sent to the client in any number of ways including networks and magnetic media like floppies.

Once the PUT is installed on the client, the PUT is executed at step 310. Although multi-tasking and multi-threaded applications perform tasks in parallel, each task or thread essentially operates by executing statements in sequential order. Accordingly, in discussing this figure, all applications will be generalized to this sequential execution of statements.

At step 312, the next statement is retrieved. The client then determines if the statement is a PV API call at step 314. If it is not, the PUT statement is executed at step 316. A PUT statement is basically any statement that is not a PV API call for remote monitoring.

The client calls the PV API specified by the statement at step 318. There are numerous types of PV API calls that may be called including calls that perform the following:

- starting and ending a PUT run
- controlling the amount of data being collected
- logging unstructured data
- inserting simple per-run data
- inserting complex data fields
- platform-specific functions Thus, there are a variety of PV API calls that may be made at step 318. However, the goal of most of the calls revolves around data collection regarding the execution of the PUT.

The PV API calls allow the developer to specify characteristics of the data that will be collected during a PUT run. For example, in addition to the developer being able to turn data collection on and off at locations in the PUT with PV_On and PV_Off, the developer is also able to specify that data collected under a given type should be discarded (e.g., to reduce the amount of collected data that is sent to the server). Additionally, the developer may specify that data collected will be stored in a database table with the calls PV_DBAddStringToRow and PV_DBAddIntToRow. Thus, the developer is provided great flexibility in specifying what data will be collected and how the data will be available.

At step 320, it is determined whether the PUT is finished executing. If it is not, execution resumes at step 312 where the next statement is retrieved. Otherwise, the client performs END-HOOK data collection at step 322. In a preferred embodiment, END-HOOK is the mechanism in Windows through which data is collected after the PUT terminates or crashes. In order to aid the developer in tracking down crashes, information regarding the hardware, operating system, PUT (e.g., version number), and the like may be automatically collected to indicate the environment of the client. In a preferred embodiment, this information is automatically collected with a single API call, PV_Start.

Once the data is collected regarding the PUT execution, the data is sent to the server at step 324. Once at the server, the data may be analyzed. The data may be analyzed to fix bugs in the PUT, track feature utilization, optimize execution of the PUT, and the like.

Figure 5:
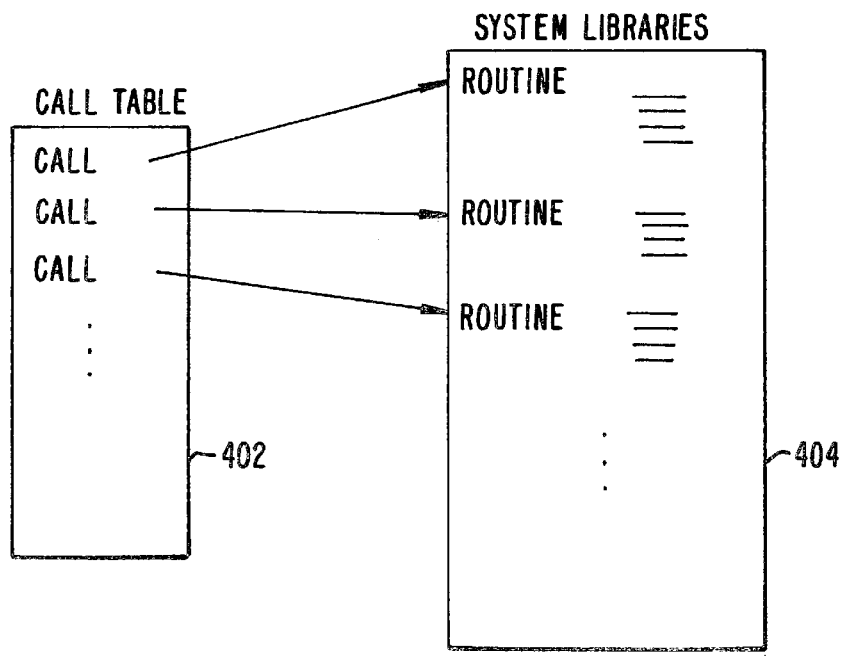
FIG. 5 illustrates a mechanism operating systems utilize to access routines in a system library.

FIG. 5 illustrates a mechanism operating systems utilize to access routines in a system library. A call table 402 is kept in memory and associates system calls to routines in a system library 404. For each call, a pointer indicates the routine in the system library that should be executed for the call. For example, one call in the table would be the exit( ) call which would then result in executing a routine in the system library that exits or terminates the current process (with exit codes). In Windows, the call table is also called the Windows system table and the system library may be called the Windows run-time DLL. These structures are also available in Unix and other operating systems.

Figure 6:
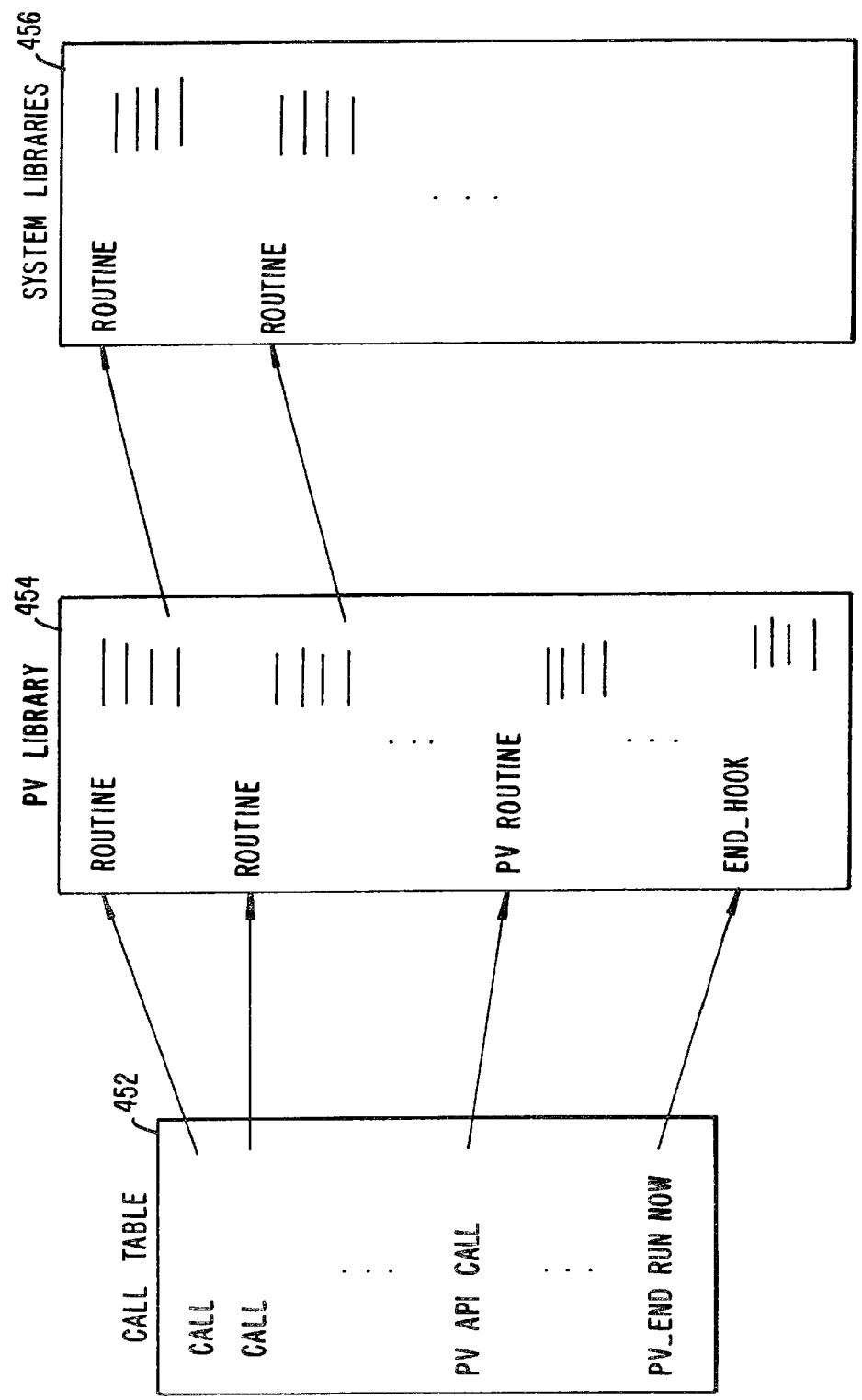
FIG. 6 illustrates utilizing hooks to intercept systems calls and PV API calls.

FIG. 6 illustrates utilizing hooks to intercept system calls and PV API calls. Utilizing hooks, a preferred embodiment of the invention intercepts the calls in the call table. A call table 452 is modified utilizing hooks to redirect the system calls to a PV library 454. The PV library includes routines that include statements to facilitate remote monitoring of PUT execution. The routines in the PV library may also call routines in a system library 456. In a preferred embodiment, the PV library is a Windows DLL.

Additionally, PV API calls are also added to call table 452 so that the appropriate routines in the PV library will be called. As an example, FIG. 6 shows that a PV API call PV_EndRunNow may cause the execution of the END_HOOK routine in the PV library. The PV_EndRunNow terminates the data collection on the client but allows the PUT to continue execution.

FIG. 7 is a table of types of end-run-conditions for PUTs and the information that may be available in each case. Correctly identifying and reporting the way a PUT finished execution provides significant information to a developer. In a preferred embodiment, there are seven ways in which a PUT may stop execution (which are shown in the table of FIG. 7):

1. PUT Normal Exit—exiting by invoking a member of the exit family of routines or returning from the main routine
2. PUT exec( )—invoking a different executable by successfully calling exec
3. PUT Exception Caught by Developer—catching an exception or signal in an exception handler and invoking exit from the handler
4. PUT Exception Uncaught by Developer—encountering an uncaught exception
5. PUT Dies via uncatchable event—encountering an uncatchable event (e.g., stack overflow or kill process)
6. Developer ends run before PUT ends—PV API call to stop data collection (PV_EndRunNow)
7. PureVision Dies via an unexpected event—the data collection software of the present invention halts (e.g., power off or internal error)

All of the above end-of-run types except for 4. would pass through the modified call table. The information available indicates the information the present invention may analyze and include in the data collected that will be sent to the server.

Figure 8:
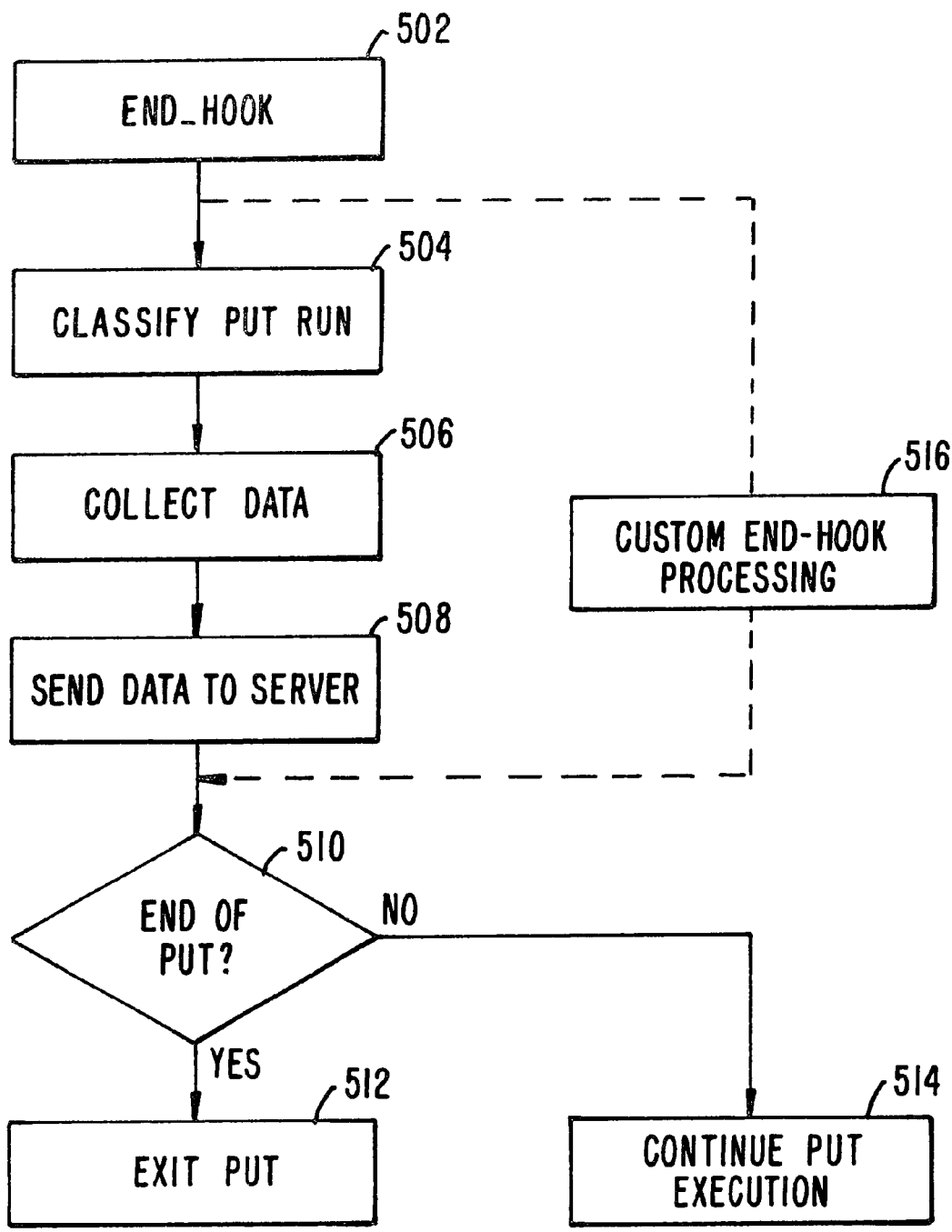
FIG. 8 is a high level flowchart of a process of end-of-run processing of a computer program.

FIG. 8 is a high level flowchart of a process of end-of-run processing of a PUT. When an end-of-run (i.e., the end of data collection except for the final data collection for the end-of-run) occurs, the routine END_HOOK is executed in the PV library at step 502. The present invention includes a default for handing the end of run. By default the present invention automatically intercepts and reports end-of-run instances as follows.

At step 504, the PUT run is classified. The PUT run is classified as either a normal or abnormal run. In Windows, an abnormal run is defined as a PUT that terminates with an uncaught exception or with a caught exception followed by a non-zero exit code. Similarly, on Unix an abnormal run is defined as a PUT that terminates with an uncaught signal or exits with a non-zero exit code.

Data is collected for the end-of-run at step 506. As mentioned earlier, information regarding the hardware, operating system, PUT (e.g., version number), user identifier, PUT start time, PUT execution duration, exit code, exit exception, and the like may be automatically collected to indicate the environment of the client at an end-of-run. Additionally, in the event of an abnormal run, stack information of the client may be collected for analysis on the server.

At step 508, the collected data is sent to the server. The server may then remotely analyze the data it receives. If the end of the PUT is reached at step 510, the PUT is exited at step 512. Otherwise, the PUT continues execution at step 514. In a preferred embodiment, the collected data is automatically transmitted to the server without requiring the client to issue a command to send the collected data.

Although the present invention provides a default mechanism for handling end-of-run situations, it also allows the developer to customize end-of-run processing. The PV API PV_RegisterEndHook allows a callback function to be defined that will be utilized instead of the default end-of-run processing. The custom END_HOOK processing is shown as step 516 in FIG. 8.

Figure 9:
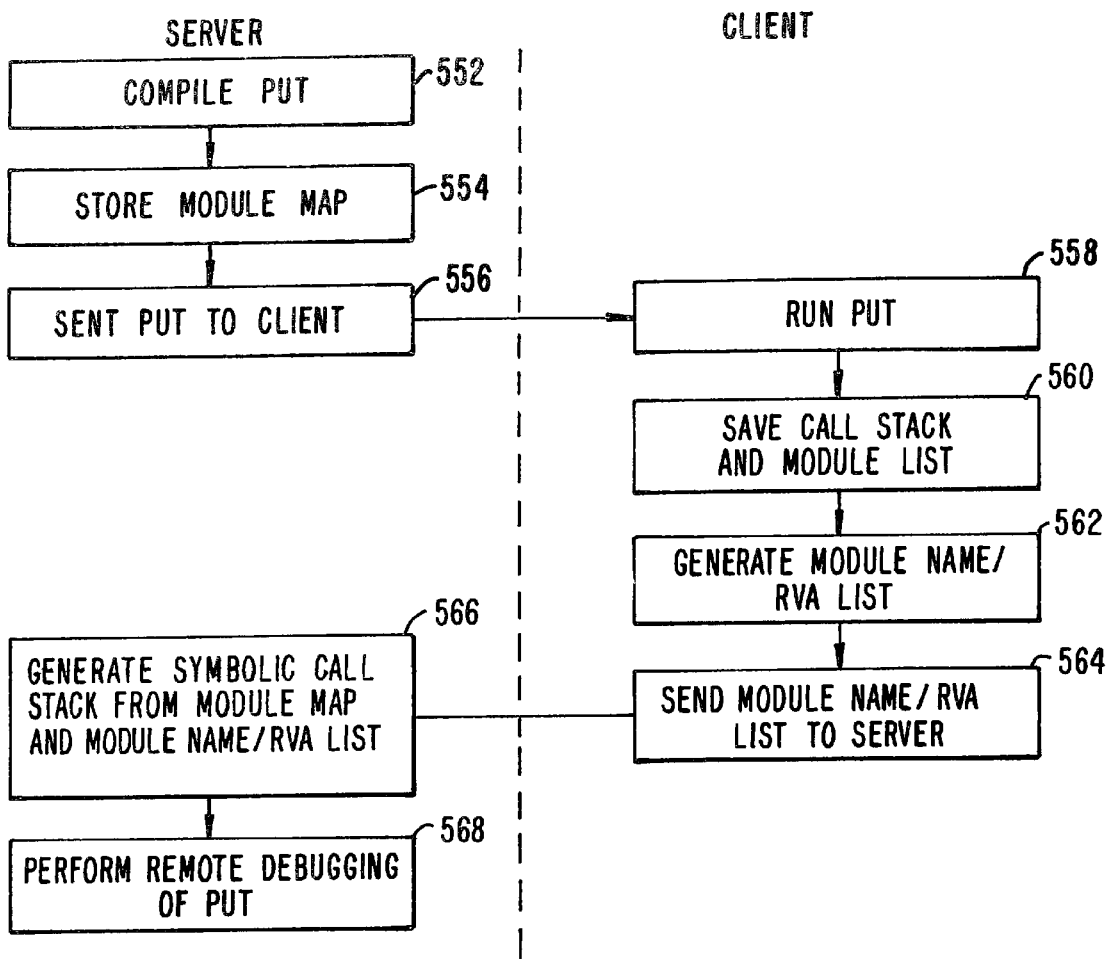
FIG. 9 is a high level flowchart of a process of performing remote debugging of a computer program.

FIG. 9 is a high level flowchart of a process of performing remote debugging of a PUT on the server. Some of the steps that may be utilized are not shown in the figure. For example, it is not shown that the PUT is linked into an executable program. However, these steps will be readily apparent to one of skill in the art.

At step 552, the PUT is compiled with the source code including PV API calls to collect data for remote debugging. A module map is created during compilation and it is stored at step 554. The module map is essentially a table that for each module in the PUT source code contains the address and offset of every function in the module. Typically, the module map is stored on nonvolatile storage (e.g., a hard drive) on the server.

The executable PUT is sent to the client at step 556. On the client-side, the PUT is executed at step 558. When an end-of-run is encountered, the END_HOOK directs the client to save both the call stack and the module list at step 560. The call stack is a list of addresses of function calls that were sequentially invoked during the PUT execution. The call stack is therefore generated while the PUT runs.

The module list is a list of modules, including modules in the executable and any DLLs, along with the base address and size of each module. The module list is also created while the PUT runs.

At step 562, the client generates a module name/relative virtual address (RVA) list. The module name/RVA list is generated from the call stack and the module list. The module name/RVA list shows the sequence of function calls as a list of module names and relative offsets into each module. Typically, the module name/RVA list is generated during end-of-run processing.

The module name/RVA list is sent to the server along with any other collected data at step 564. On the server, a symbolic call stack is generated from the module map and the module name/RVA list at step 566. The symbolic call stack is the sequence of functions calls including the module name, function name, and offset into the function for each call. Utilizing the symbolic call stack, the PUT may be remotely debugged on the server at step 568. In a preferred embodiment, the present invention also reports uniqueness of the call stacks so that a developer may more quickly determine if the same problem is occurring on other clients' computers.

Figure 10:
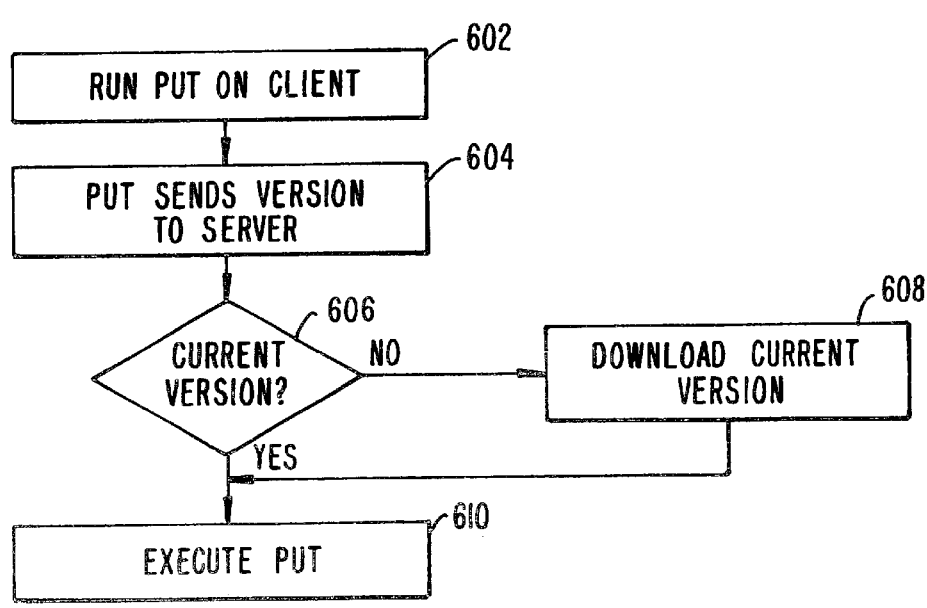
FIG. 10 is a high level flowchart of a process of remotely upgrading the version of a computer program.

FIG. 10 is a high level flowchart of a process of remotely upgrading the version of a PUT. The present invention also provides bidirectional communication between the server and the client. The developer may inform the client of upgrades and/or automatically have new software (e.g., new products, versions or patches) downloaded onto the client's machine.

As an example, step 602 shows a PUT running on the client computer. During execution, a PV API call (e.g., PV_Start) sends the PUT version number to the server at step 604. The server receives the PUT version number and determines if the version is current at step 606. If the version is not current, the current version (or a patch) may be downloaded to the client at step 608. Additionally, the client may be queried as to whether it is desirable to get an upgrade in the event that they would prefer to retain the older version for any number of reasons (e.g., stability).

Whether a new version is downloaded or not, the PUT continues execution at step 610. Utilizing this process, the developer is able to accurately track which clients are running what versions of software. Additionally, as the developer is able to more quickly upgrade older versions, the testing of the program is more efficient as clients do not continue to run older versions reporting old problems or bugs.

Figure 11:
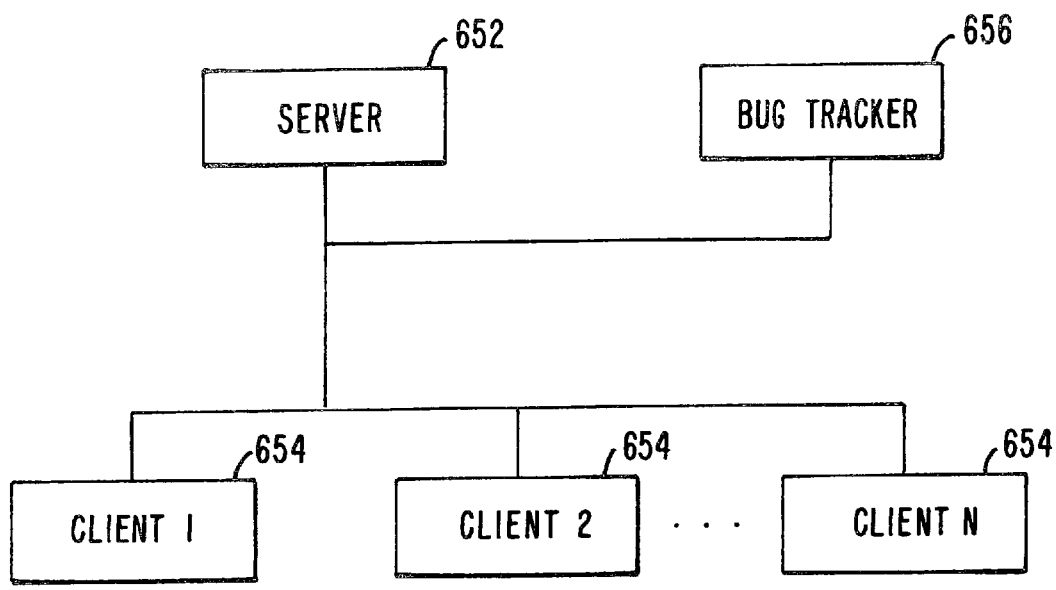
FIG. 11 is a block diagram of a bug tracker interfacing with a computer system of the present invention.

FIG. 11 is a block diagram of a bug tracker interfacing with a computer system of the present invention. The present invention may also interface with commercially available (or ones created by the developer) bug tracking software. A distributed system including a server computer 652 and multiple client computers 654 are shown.

A bug tracking application 656 is designed to track the bugs that are found in the PUT and other information regarding the bug. When an event occurs during execution of the PUT that necessitates reporting (e.g., a bug), a PV API call is utilized to collect the data for reporting the event to the bug tracking application.

The bug tracking application may receive the information it requires directly from the clients or the clients may send information to the server with the server collecting the information. The server may then format the collected bug information and sends it to the bug tracking application. Additionally, a PV API call may send collected data to more than one server if this is desirable for the developer.

Figure 12:
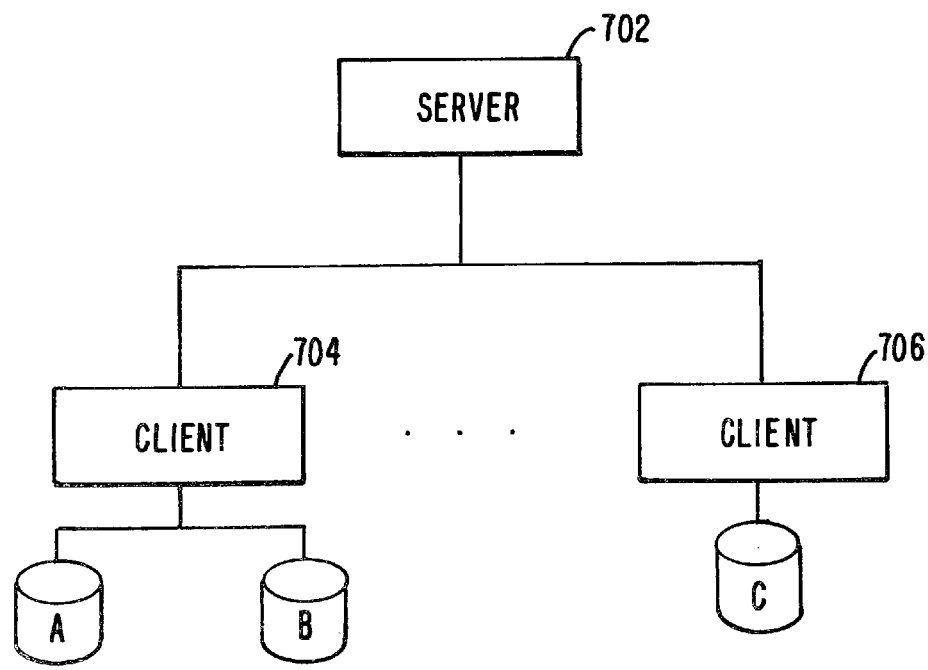
FIG. 12 is a block diagram of a computer system remotely monitoring computer programs in a multi-tasking or multi-threaded environment.

FIG. 12 is a block diagram of a computer system remotely monitoring PUTs in a multi-tasking or multi-threaded environment. It is desirable for developers to know how two or more programs (or threads) interact in a multi-tasking (or multi-threaded) environment. For example, it may be useful to know which application is the bottleneck, the sequence of application calls or what percentage of processor time is consumed by each application.

As shown, a server computer 702 is in communication with a client computers 704 and 706. Programs A and B are running on one client and program C is running on another client. Although A and B are described as programs, they may also be threads of the same program. Programs A, B and C are running concurrently and separate data is collected for each program (although the data may be stored on the same hard driver, it is shown separate for clarity). In a preferred embodiment, PV_Start returns a handle that may be utilized to uniquely identify a program or thread. The other PV API calls may receive this handle as a parameter so that data for each program or thread is collected together.

In a preferred embodiment, the data collected for each program includes timestamps as to when the program began running. Additionally, information that indicates what program invoked another program may be collected. Once this collected data is received by the server, the server will be able to reconstruct the sequence of program execution on the clients.

Figure 13:
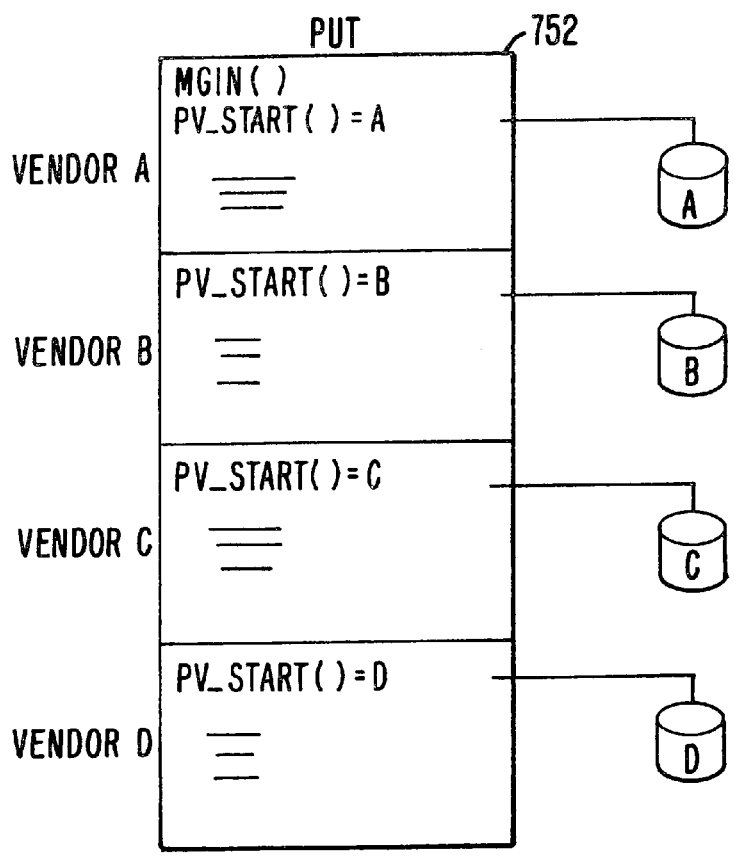
FIG. 13 is a block diagram of a computer system remotely monitoring computer programs incorporating portions from multiple vendors.

FIG. 13 is a block diagram of a computer system remotely monitoring computer programs incorporating code portions from multiple vendors. A PUT may include code portions or sections from multiple vendors. However, each vendor should receive information specific to the code that they produced. As shown a PUT 752 includes code portions from vendors A, B, C, and D. When the code for a specific vendor is entered, a PV_Start call is made which returns a handle specifying the appropriate vendor (e.g., A). Other PV API calls may then be sent to the appropriate handle specifying which vendors' code has generated the call and in which file the collected data should be stored. Thus, data for each vendor may be collected and stored separately (although, of course, it may be on the same hard drive).

Although the above has described modifying the source code to include PV API calls for data collection, the present is not limited to any specific method. For example, the present invention may utilize object code processing that inserts the data collection instructions into the object code of the PUT.

Figure 14:
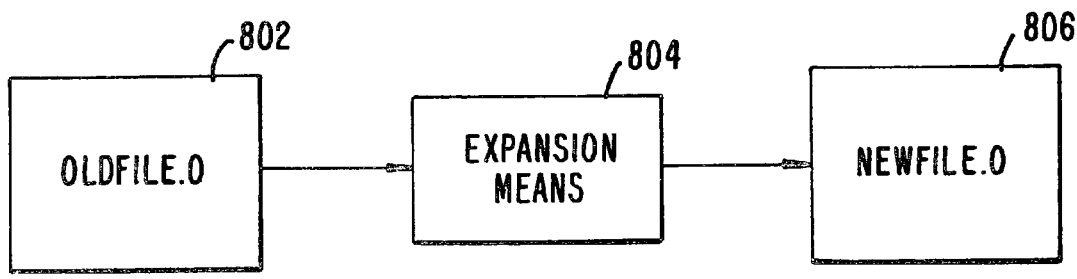
FIG. 14 shows an object code file augmented to include new data collection instructions.

FIG. 14 shows an object code file augmented to include new data collecting instructions. A preexisting object code file 802 ("OLDFILE.O") is augmented by an expansion means 804 to include data collecting instructions for the present invention. An augmented object code file 806 ("NEWFILE.O"). Typically, the expansion means is a general purpose computer like the one shown in FIG. 1. As the expansion means operates on object code, remote monitoring may be performed on the final executable product, not just those portions for which source code is available.

The Microfiche Appendix includes source code for implementing an embodiment of the invention. The source is written in C++ and is designed for an IBM compatible computer running under one of the Windows family of operating systems.

Appendix A, a PureVision Unix & Windows API Specification, and Appendix B, a PureVision Programmers' Guide, are filed herewith as part of the application and are incorporated by reference for all purposes.

While the above is a complete description of the preferred embodiments of the invention, various alternatives, modifications and equivalents may be used. It should be evident that the present invention is equally applicable by making appropriate modifications to the embodiments described above. Therefore, the above description should not be taken as limiting the scope of the invention which is defined by the metes and bounds of the appended claims.

What is claimed is:

1. In a computer system, a method of remotely monitoring execution of a computer program, comprising:
   collecting data during an execution of a computer program using at least one monitoring instruction, the at least one monitoring instruction being associated with the computer program, the data being associated with the execution; and
   sending the collected data to a remote system.

2. The method of claim 1 wherein sending the collected data to the remote system includes automatically sending the collected data to the remote system.

3. The method of claim 1 further including changing the at least one monitoring instruction over the computer program development cycle.

4. The method of claim 1 further including classifying the execution of the computer program as normal or abnormal.

5. The method of claim 4 further including saving a call stack in the collected data if the execution of the computer program is classified as abnormal.

6. The method of claim 1 further including allowing a user to customize processing that will be performed when the computer program finishes the execution.

7. The method of claim 1 further including generating a symbolic call stack on the remote system so that the computer program may be debugged remotely.

8. The method of claim 1 wherein the computer program is compiled on the remote system, the method further including storing a module map when the computer program is compiled on the remote system.

9. The method of claim 1 further including remotely debugging the computer program.

10. The method of claim 1 further including sending a version of the computer program to the remote system during the execution of the computer program.

11. The method of claim 10 further including downloading a new version of the computer program from the remote system.

12. The method of claim 1 further including incorporating the at least one monitoring instruction into the computer program.

13. The method of claim 1 further including linking the at least one monitoring instruction into the computer program.

14. A computing system comprising:
   a client, the client being arranged to execute a computer program, the computer program being associated with at least one monitoring instruction, the at least one monitoring instruction being arranged to collect data associated with an execution of the computer program, wherein the client is further arranged to transmit the collected data; and
   a server, the server being arranged to receive the collected data.

15. The computing system of claim 14 wherein the server is further arranged to compile and to link the at least one monitoring instruction into the computer program.

16. The computing system of claim 14 wherein the server is further arranged to analyze the collected data.

17. The computing system of claim 16 wherein the server is arranged to analyze the collected data to correct errors associated with the execution of the computer program.

18. The computing system of claim 16 wherein the server is arranged to analyze the collected data to substantially optimize the execution of the computer program.

19. The computing system of claim 14 further comprising a transport medium that connects the client and the server.

20. A distributed computing system comprising:
   a client computer;
   a server computer, the server computer being in communication with the client computer; and
   a computer program, the computer program being arranged to execute on the client computer, the computer program including at least one monitoring instruction that enables the server computer to remotely monitor execution of the computer program.

21. The distributed computing system of claim 20 wherein the server computer is arranged to provide the at least one monitoring instruction to the client computer.

22. The distributed computing system of claim 20 further including a transport medium, the transport medium being arranged to communicably connect the client computer and the server computer.

23. The distributed computing system of claim 22 wherein the transport medium is a network.

24. The distributed computing system of claim 20 wherein the server computer is arranged to remotely debug the computer program.

* * * * *